United States Patent
Every et al.

(10) Patent No.: US 9,378,754 B1
(45) Date of Patent: Jun. 28, 2016

(54) ADAPTIVE SPATIAL CLASSIFIER FOR MULTI-MICROPHONE SYSTEMS

(75) Inventors: Mark Every, Palo Alto, CA (US); Ludger Solbach, Mountain View, CA (US)

(73) Assignee: Knowles Electronics, LLC, Itasca, IL (US)

( * ) Notice: Subject to any disclaimer, the term of this patent is extended or adjusted under 35 U.S.C. 154(b) by 480 days.

(21) Appl. No.: 12/841,061

(22) Filed: Jul. 21, 2010

Related U.S. Application Data (60) Provisional application No. 61/329,037, filed on Apr. 28, 2010.

(51) Int. Cl.
*G10L 21/00* (2013.01)
*G10L 21/0272* (2013.01)
*H04B 3/20* (2006.01)
*G10L 21/0208* (2013.01)
*G10L 21/0216* (2013.01)

(52) U.S. Cl.
CPC .......... *G10L 21/0272* (2013.01); *G10L 21/0208* (2013.01); *G10L 2021/02082* (2013.01); *G10L 2021/02166* (2013.01); *H04B 3/20* (2013.01)

(58) Field of Classification Search
CPC ............ G10L 21/0208; G10L 21/0272; G10L 2021/02082; G10L 2021/02166; H04M 9/082; H04B 3/20
USPC ..................................... 704/226, 233; 308/94
See application file for complete search history.

(56) References Cited

U.S. PATENT DOCUMENTS

| 3,946,157 A | 3/1976 | Dreyfus |
| 4,131,764 A | 12/1978 | Claasen et al. |
| 4,630,304 A * | 12/1986 | Borth et al. .................. 381/94.3 |
| 4,766,562 A | 8/1988 | Vary |
| 4,813,076 A | 3/1989 | Miller |
| 4,815,023 A | 3/1989 | Arbeiter |
| 4,827,443 A | 5/1989 | Meerkotter et al. |
| 4,896,356 A | 1/1990 | Millar |

(Continued)

FOREIGN PATENT DOCUMENTS

| EP | 0343792 A2 | 11/1989 |
| FI | 123080 | 10/2012 |

(Continued)

OTHER PUBLICATIONS

International Search Report and Written Opinion dated May 20, 2010 in Patent Cooperation Treaty Application No. PCT/US2009/006754.

(Continued)

*Primary Examiner* — Jialong He
(74) *Attorney, Agent, or Firm* — Carr & Ferrell LLP (57) ABSTRACT

A robust noise suppression system may concurrently reduce noise and echo components in an acoustic signal while limiting the level of speech distortion. The system may receive acoustic signals from two or more microphones in a close-talk, hand-held or other configuration. The received acoustic signals are transformed to cochlea domain sub-band signals and echo and noise components may be subtracted from the sub-band signals. Features in the acoustic sub-band signals are identified and used to generate a multiplicative mask. The multiplicative mask is applied to the noise subtracted sub-band signals and the sub-band signals are reconstructed in the time domain.

18 Claims, 6 Drawing Sheets

(56) References Cited

U.S. PATENT DOCUMENTS

| | | | |
|---|---|---|---|
| 5,144,569 A | 9/1992 | Kunold | |
| 5,285,165 A | 2/1994 | Renfors et al. | |
| 5,504,455 A | 4/1996 | Inkol | |
| 5,583,784 A | 12/1996 | Kapust et al. | |
| 5,640,490 A | 6/1997 | Hansen et al. | |
| 5,671,287 A | 9/1997 | Gerzon | |
| 5,682,463 A | 10/1997 | Allen et al. | |
| 5,787,414 A | 7/1998 | Miike et al. | |
| 5,819,217 A * | 10/1998 | Raman | 704/233 |
| 5,839,101 A * | 11/1998 | Vahatalo et al. | 704/226 |
| 5,933,495 A * | 8/1999 | Oh | 379/406.08 |
| 5,937,060 A * | 8/1999 | Oh | H04M 9/082 370/286 |
| 5,937,070 A | 8/1999 | Todter et al. | |
| 5,956,674 A | 9/1999 | Smyth et al. | |
| 5,974,380 A | 10/1999 | Smyth et al. | |
| 6,018,708 A | 1/2000 | Dahan et al. | |
| 6,041,127 A | 3/2000 | Elko | |
| 6,067,517 A | 5/2000 | Bahl et al. | |
| 6,104,822 A | 8/2000 | Melanson et al. | |
| 6,198,668 B1 | 3/2001 | Watts | |
| 6,226,616 B1 | 5/2001 | You et al. | |
| 6,738,482 B1 * | 5/2004 | Jaber | 381/94.7 |
| 6,757,652 B1 | 6/2004 | Lund et al. | |
| 6,947,509 B1 | 9/2005 | Wong | |
| 6,954,745 B2 | 10/2005 | Rajan | |
| 6,978,027 B1 | 12/2005 | Dahl et al. | |
| 7,003,099 B1 * | 2/2006 | Zhang et al. | 379/406.03 |
| 7,099,821 B2 * | 8/2006 | Visser et al. | 704/226 |
| 7,319,959 B1 | 1/2008 | Watts | |
| 7,359,504 B1 * | 4/2008 | Reuss et al. | 379/406.02 |
| 7,528,679 B2 | 5/2009 | Dick | |
| 7,555,075 B2 | 6/2009 | Pessoa et al. | |
| 7,881,482 B2 | 2/2011 | Christoph | |
| 8,189,766 B1 * | 5/2012 | Klein | H04M 9/085 379/406.07 |
| 8,718,290 B2 | 5/2014 | Murgia et al. | |
| 8,934,641 B2 | 1/2015 | Avendano et al. | |
| 2001/0016020 A1 | 8/2001 | Gustafsson et al. | 375/346 |
| 2001/0038323 A1 | 11/2001 | Christensen | |
| 2002/0067836 A1 | 6/2002 | Paranjpe | |
| 2003/0040908 A1 * | 2/2003 | Yang et al. | 704/233 |
| 2003/0169887 A1 | 9/2003 | Fujita et al. | |
| 2003/0219130 A1 * | 11/2003 | Baumgarte et al. | 381/17 |
| 2003/0228019 A1 | 12/2003 | Eichler et al. | |
| 2004/0105550 A1 * | 6/2004 | Aylward et al. | 381/17 |
| 2004/0111258 A1 * | 6/2004 | Zangi et al. | 704/226 |
| 2004/0213416 A1 | 10/2004 | Dahl et al. | |
| 2004/0220800 A1 * | 11/2004 | Kong et al. | 704/205 |
| 2004/0252772 A1 | 12/2004 | Renfors et al. | |
| 2005/0152083 A1 | 7/2005 | Dick | |
| 2005/0226426 A1 * | 10/2005 | Oomen et al. | 381/23 |
| 2006/0053018 A1 | 3/2006 | Engdegard et al. | |
| 2006/0093152 A1 | 5/2006 | Thompson et al. | |
| 2006/0093164 A1 | 5/2006 | Reams et al. | |
| 2006/0106620 A1 | 5/2006 | Thompson et al. | |
| 2006/0149532 A1 | 7/2006 | Boillot et al. | |
| 2006/0198542 A1 | 9/2006 | Benjelloun Touimi et al. | |
| 2006/0239473 A1 | 10/2006 | Kjorling et al. | |
| 2006/0259531 A1 | 11/2006 | Christoph | |
| 2006/0270468 A1 | 11/2006 | Hui et al. | |
| 2007/0008032 A1 | 1/2007 | Kyu et al. | |
| 2007/0033020 A1 * | 2/2007 | (Kelleher) Francois et al. | 704/226 |
| 2007/0055505 A1 * | 3/2007 | Doclo et al. | 704/226 |
| 2007/0067166 A1 | 3/2007 | Pan et al. | |
| 2007/0088544 A1 | 4/2007 | Acero et al. | |
| 2007/0100612 A1 | 5/2007 | Ekstrand et al. | |
| 2007/0121952 A1 | 5/2007 | Engdegard et al. | |
| 2007/0223755 A1 | 9/2007 | Salvetti et al. | |
| 2007/0230710 A1 | 10/2007 | Van Loon et al. | |
| 2007/0233479 A1 * | 10/2007 | Burnett | 704/233 |
| 2007/0270988 A1 | 11/2007 | Goldstein et al. | |
| 2007/0276656 A1 | 11/2007 | Solbach et al. | |
| 2008/0019548 A1 * | 1/2008 | Avendano | 381/313 |
| 2008/0025519 A1 | 1/2008 | Yu et al. | |
| 2008/0043827 A1 | 2/2008 | Renfors et al. | |
| 2008/0069374 A1 | 3/2008 | Zhang | |
| 2008/0162123 A1 * | 7/2008 | Goldin | 704/205 |
| 2008/0170711 A1 | 7/2008 | Breebaart et al. | |
| 2008/0175422 A1 | 7/2008 | Kates | |
| 2008/0247556 A1 * | 10/2008 | Hess | 381/59 |
| 2008/0306736 A1 * | 12/2008 | Sanyal | G10L 19/0019 704/233 |
| 2009/0003614 A1 | 1/2009 | Neunaber | |
| 2009/0003640 A1 | 1/2009 | Burnett | |
| 2009/0012783 A1 * | 1/2009 | Klein | 704/226 |
| 2009/0018828 A1 | 1/2009 | Nakadai et al. | |
| 2009/0080632 A1 | 3/2009 | Zhang et al. | |
| 2009/0089053 A1 * | 4/2009 | Wang et al. | 704/233 |
| 2009/0164212 A1 * | 6/2009 | Chan et al. | 704/226 |
| 2009/0220107 A1 | 9/2009 | Every et al. | |
| 2009/0220197 A1 | 9/2009 | Gniadek et al. | |
| 2009/0248411 A1 * | 10/2009 | Konchitsky et al. | 704/242 |
| 2009/0262969 A1 | 10/2009 | Short et al. | |
| 2009/0290736 A1 | 11/2009 | Alfsmann et al. | |
| 2009/0296958 A1 | 12/2009 | Sugiyama | |
| 2009/0302938 A1 | 12/2009 | Andersen et al. | |
| 2009/0316918 A1 * | 12/2009 | Niemisto et al. | 381/58 |
| 2009/0323982 A1 * | 12/2009 | Solbach et al. | 381/94.3 |
| 2010/0094643 A1 | 4/2010 | Avendano et al. | |
| 2010/0146026 A1 | 6/2010 | Christoph | |
| 2010/0272197 A1 | 10/2010 | Har et al. | |
| 2010/0296668 A1 | 11/2010 | Lee et al. | |
| 2011/0182436 A1 | 7/2011 | Murgia et al. | |
| 2012/0140951 A1 | 6/2012 | Solbach et al. | |
| 2014/0205107 A1 | 7/2014 | Murgia et al. | |

FOREIGN PATENT DOCUMENTS

| | | |
|---|---|---|
| JP | 2008518257 A | 5/2008 |
| JP | 5675848 B2 | 1/2015 |
| JP | 5718251 B2 | 3/2015 |
| KR | 1020070068270 | 6/2007 |
| KR | 1020080109048 | 12/2008 |
| TW | 200705389 | 2/2007 |
| TW | 201142829 A | 12/2011 |
| WO | WO2010077361 A1 | 7/2010 |
| WO | WO2011094232 A1 | 8/2011 |

OTHER PUBLICATIONS

Fast Cochlea Transform, US Trademark Reg. No. 2,875,755 (Aug. 17, 2004).

International Search Report and Written Opinion dated Mar. 31, 2011 in Application No. PCT/US11/22462.

Gold et al., Theory and Implementation of the Discrete Hilbert Transform, Symposium on Computer Processing in Communications Polytechnic Institute of Brooklyn, Apr. 8-10, 1969.

Office Action mailed Apr. 8, 2014 in Japanese Patent Application 2011-544416, filed Dec. 30, 2009.

Notice of Allowance dated Nov. 25, 2014 in Japanese Application No. 2012-550214, filed Jul. 24, 2012.

Nayebi et al., "Low delay FIR filter banks: design and evaluation" IEEE Transactions on Signal Processing, vol. 42, No. 1, pp. 24-31, Jan. 1994.

Notice of Allowance mailed Feb. 17, 2015 in Japanese Patent Application No. 2011-544416, filed Dec. 30, 2009.

Office Action mailed Mar. 27, 2015 in Korean Patent Application No. 10-2011-7016591, filed Dec. 30, 2009.

Office Action mailed Apr. 17, 2015 in Taiwanese Patent Application No. 100102945, filed Jan. 26, 2011.

Office Action mailed May 11, 2015 in Finnish Patent Application 20125814, filed Jan. 25, 2011.

Office Action mailed Oct. 15, 2015 in Korean Patent Application 10-2011-7016591.

Notice of Allowance, Sep. 25, 2000, U.S. Appl. No. 09/356,485, filed Jul. 19, 1999.

Non-Final Office Action, Jan. 10, 2007, U.S. Appl. No. 10/439,284, filed May 14, 2003.

(56) References Cited

OTHER PUBLICATIONS

Final Office Action, May 24, 2007, U.S. Appl. No. 10/439,284, filed May 14, 2003.
Advisory Action, Aug. 6, 2007, U.S. Appl. No. 10/439,284, filed May 14, 2003.
Notice of Allowance, Sep. 14, 2007, U.S. Appl. No. 10/439,284, filed May 14, 2003.
Non-Final Office Action, Dec. 6, 2011, U.S. Appl. No. 12/319,107, filed Dec. 31, 2008.
Final Office Action, Apr. 16, 2012, U.S. Appl. No. 12/319,107, filed Dec. 31, 2008.
Advisory Action, Jun. 28, 2012, U.S. Appl. No. 12/319,107, filed Dec. 31, 2008.
Non-Final Office Action, Jul. 2, 2012, U.S. Appl. No. 12/693,998, filed Jan. 26, 2010.
Non-Final Office Action, Oct. 2, 2012, U.S. Appl. No. 12/906,009, filed Oct. 15, 2010.
Final Office Action, Dec. 19, 2012, U.S. Appl. No. 12/693,998, filed Jan. 26, 2010.
Advisory Action, Feb. 19, 2013, U.S. Appl. No. 12/693,998, filed Jan. 26, 2010.
Advisory Action, Mar. 7, 2013, U.S. Appl. No. 12/693,998, filed Jan. 26, 2010.
Non-Final Office Action, Mar. 14, 2013, U.S. Appl. No. 12/896,378, filed Oct. 1, 2010.
Non-Final Office Action, Jul. 2, 2013, U.S. Appl. No. 12/906,009, filed Oct. 15, 2010.
Final Office Action, Oct. 10, 2013, U.S. Appl. No. 12/896,378, filed Oct. 1, 2010.
Notice of Allowance, Dec. 31, 2013, U.S. Appl. No. 12/693,998, filed Jan. 26, 2010.
Non-Final Office Action, Jan. 3, 2014, U.S. Appl. No. 12/319,107, filed Dec. 31, 2008.
Final Office Action, May 7, 2014, U.S. Appl. No. 12/906,009, filed Oct. 15, 2010.
Non-Final Office Action, Jun. 5, 2014, U.S. Appl. No. 12/896,378, filed Oct. 1, 2010.
Notice of Allowance, Aug. 25, 2014, U.S. Appl. No. 12/319,107, filed Dec. 31, 2008.
Non-Final Office Action, Apr. 21, 2015, U.S. Appl. No. 12/906,009, filed Oct. 15, 2010.
Final Office Action, May 26, 2015, U.S. Appl. No. 13/397,597, filed Feb. 15, 2012.
Final Office Action, Jul. 1, 2015, U.S. Appl. No. 12/896,378, filed Oct. 1, 2010.
Non-Final Office Action, Oct. 9, 2015, U.S. Appl. No. 14/222,255, filed Mar. 21, 2014.

\* cited by examiner

ADAPTIVE SPATIAL CLASSIFIER FOR MULTI-MICROPHONE SYSTEMS

CROSS-REFERENCE TO RELATED APPLICATIONS

This application claims the benefit of U.S. Provisional Application Ser. No. 61/329,037, entitled "Adaptive Spatial Classifier for Multi-Microphone Systems," filed Apr. 28, 2010, the disclosure of which is incorporated herein by reference.

BACKGROUND OF THE INVENTION

Noise suppression techniques often reduce noise in an audio signal by classifying a signal component as speech or noise. In multi-microphone systems, classification can be made by determining the energy difference between each microphone signal and distinguishing between a speech source and noise sources based upon orientation and proximity of the source relative to the microphone array.

Classifying noise vs. speech based on microphone energy differences is not always possible. For example, microphone sensitivity variances can make it difficult to reliably determine source location by comparing energy levels from different microphones. Additionally, fairly common conditions can blur the distinction in terms of energy level differences between a noise frame and a speech frame, such as a user speaking into a phone from a greater distance (far talk use case), hand occlusion that covers up a microphone during use, and other conditions. As such, the probability distribution of microphone energy level difference for noise overlaps the probability distribution of microphone energy level difference for speech.

To overcome the shortcomings of the prior art, there is a need for an improved noise suppression system for classifying noise and speech.

SUMMARY OF THE INVENTION

A classifier of the present technology may track time-varying or variable spatial features derived from acoustic signals captured by microphones of an audio device. The features may include spatial features derived from acoustic signals provided by multiple microphones and monaural features derived from a single microphone for a particular sub-band and time frame. The sub-band time-frame cell may be classified as a wanted (i.e., speech) or unwanted (i.e., noise) signal based on the measured features. Noise reduction may be applied to the sub-band time frame cell acoustic signals based on the classification of the cell, wherein the noise reduction may be in the form of a subtractive noise canceller or application of a multiplicative mask.

In an embodiment, noise reduction may be performed in an audio signal. A frequency analysis module may be executed by a processor to transform a primary acoustic signal received from a primary microphone and a secondary acoustic signal received from a secondary microphone to cochlea domain sub-band signals. A sub-band signal may be classified in a source inference engine based on a spatial feature. The spatial feature may be derived from the sub-band signals and a signal derived from the sub-band signals. Noise reduction may be performed on the cochlea domain sub-band signals based on the sub-band signal classification.

A system for performing noise reduction in an audio signal may include a memory, frequency analysis module, source inference module, and noise reduction module. The frequency analysis module may be stored in memory and executed to generate sub-band signals in a cochlea domain from time domain acoustic signals. The source inference module may be stored in memory and executed to classify each sub-band signal based on a spatial feature. The spatial feature may be derived from one of the time domain acoustic signals and a signal derived from the sub-band signals. The noise reduction module may be stored in memory and executed to perform noise reduction on the cochlea domain sub-band signals based on the sub-band signal classification.

DETAILED DESCRIPTION OF THE INVENTION

The present technology may track monaural and binaural features derived from acoustic signals captured by microphones of an audio device and classify acoustic sub-band signals as speech, noise or echo per sub-band and time frame. The features may include spatial features derived from multiple microphone acoustic signals and monaural features derived from a single microphone signal. The sub-band time-frame cell may be classified as a wanted (i.e., speech) or unwanted (i.e., noise) signal based on the measured features. Noise reduction may be applied to the sub-band time frame cell acoustic signals based on the classification of the cell, wherein the noise reduction may be in the form of a subtractive noise canceller or application of a multiplicative mask.

One spatial feature suitable to use for signal classification is a null-processing inter-aural level difference (NP-ILD). The NP-ILD may be determined from a ratio of the energy for a noise cancelled signal and a raw audio device microphone signal. The noise cancelled signal may be derived from a primary acoustic signal sub-bands. The raw audio acoustic signal may be from any microphone of an audio device except a primary microphone (any microphone except the primary microphone used to receive a speech signal). By generating the NP-ILD based on a noise cancelled signal, the NP-ILD feature is well-suited for classification of a signal in view of microphone flexibility and sensitivity variance and far-talk use scenarios. Usage of NP-ILD allows for greater flexibility of the placement of microphones within an audio device, may allow microphones to be placed in a front-back configuration with a separation distance between 2 and 15 cm, and may have a variation in performance of a few dB in overall suppression level.

Additional spatial features may include an inter-aural level difference (ILD), inter-aural time difference (ITD), and inter-aural phase difference (IPD). Monaural features such as pitch may be determined from a single microphone acoustic signal. Sub-band time frame cells may be classified based on spatial features or a combination of spatial features and monaural features.

Figure 1:
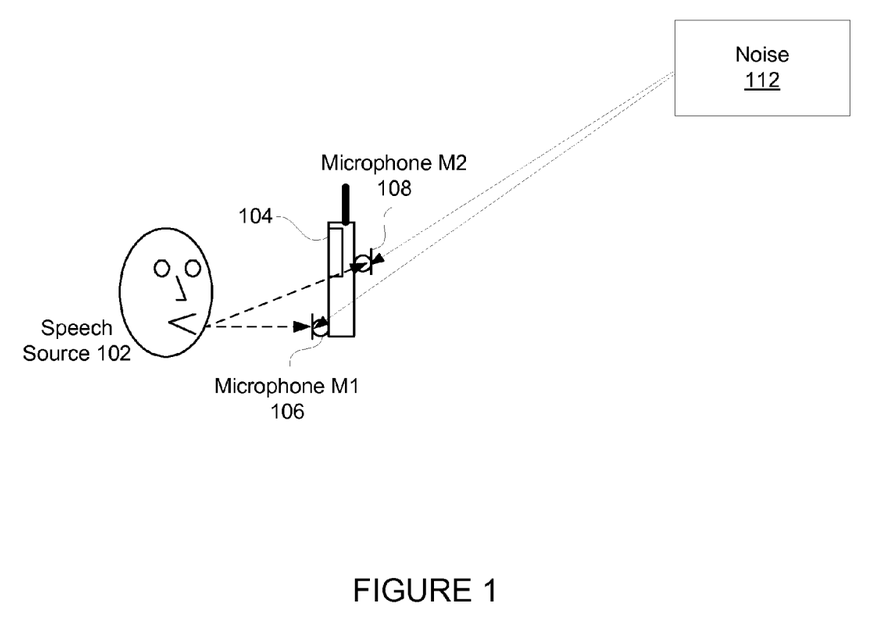
FIG. 1 is an illustration of an environment in which embodiments of the present technology may be used.

FIG. 1 is an illustration of an environment in which embodiments of the present technology may be used. A user may act as an audio (speech) source 102 to an audio device 104. The exemplary audio device 104 includes two microphones: a primary microphone 106 relative to the audio source 102 and a secondary microphone 108 located a distance away from the primary microphone 106. Alternatively, the audio device 104 may include more than two microphones, such as for example three, four, five, six, seven, eight, nine, ten or even more microphones.

The primary microphone 106 and secondary microphone 108 may be omni-directional microphones. Alternatively embodiments may utilize other forms of microphones or acoustic sensors, such as directional microphones.

While the microphones 106 and 108 receive sound (i.e. acoustic signals) from the audio source 102, the microphones 106 and 108 also pick up noise 112. Although the noise 112 is shown coming from a single location in FIG. 1, the noise 112 may include any sounds from one or more locations that differ from the location of audio source 102, and may include reverberations and echoes. The noise 112 may be stationary, non-stationary, and/or a combination of both stationary and non-stationary noise.

Some embodiments may utilize level differences (e.g. energy differences) between the acoustic signals received by the two microphones 106 and 108. Because the primary microphone 106 is much closer to the audio source 102 than the secondary microphone 108 in a close-talk use case, the intensity level is higher for the primary microphone 106, resulting in a larger energy level received by the primary microphone 106 during a speech/voice segment, for example. On the other hand, a distant noise source will tend to have a similar energy level in primary microphone 106 and secondary microphone 108, since the distance between the microphones is far smaller than the distance between the audio device 104 and the noise source.

The level difference may then be used to discriminate speech and noise in the time-frequency domain. Further embodiments may use a combination of energy level differences and time delays to discriminate speech. Based on binaural cue encoding, speech signal extraction or speech enhancement may be performed.

Figure 2:
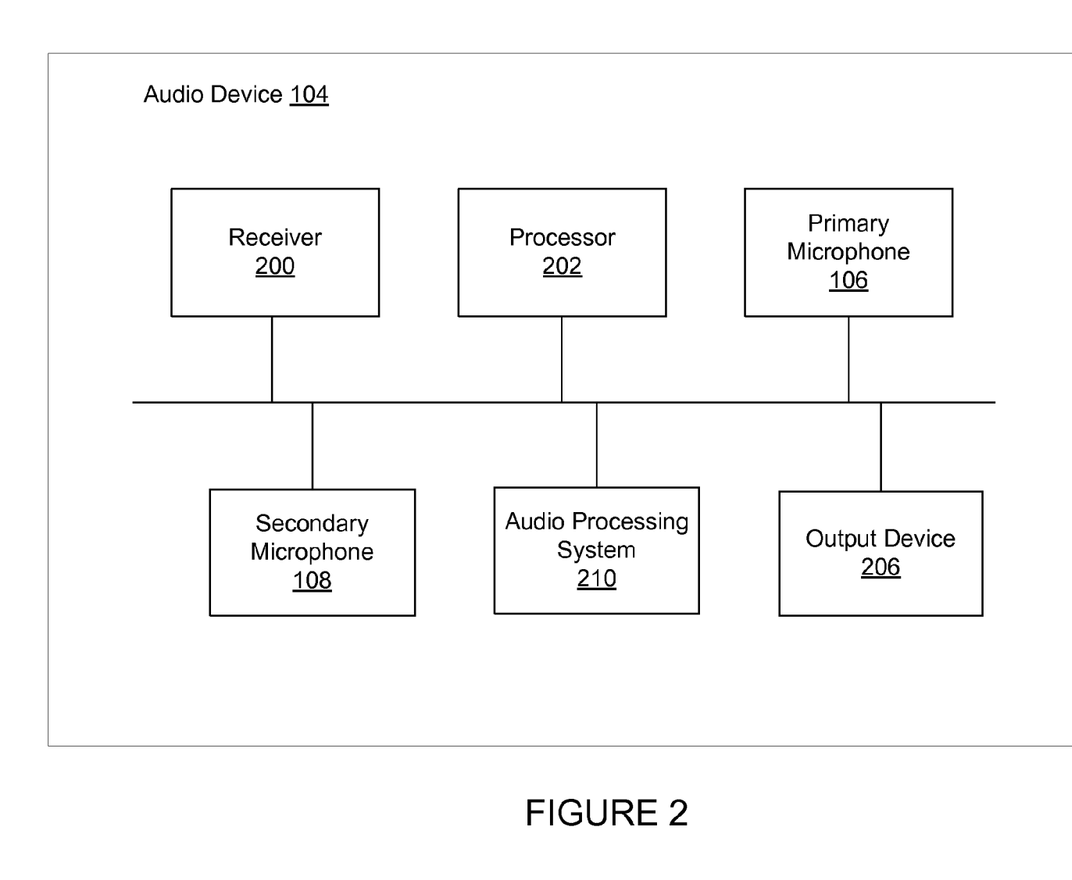
FIG. 2 is a block diagram of an exemplary audio device.

FIG. 2 is a block diagram of an exemplary audio device 104. In the illustrated embodiment, the audio device 104 includes a receiver 200, a processor 202, the primary microphone 106, an optional secondary microphone 108, an audio processing system 210, and an output device 206. The audio device 104 may include further or other components necessary for audio device 104 operations. Similarly, the audio device 104 may include fewer components that perform similar or equivalent functions to those depicted in FIG. 2.

Processor 202 may execute instructions and modules stored in a memory (not illustrated in FIG. 2) in the audio device 104 to perform functionality described herein, including noise suppression for an acoustic signal. Processor 202 may include hardware and software implemented as a processing unit, which may process floating point operations and other operations for the processor 202.

The exemplary receiver 200 is an acoustic sensor configured to receive a signal from a communications network. In some embodiments, the receiver 200 may include an antenna device. The signal may then be forwarded to the audio processing system 210 to reduce noise using the techniques described herein, and provide an audio signal to the output device 206. The present technology may be used in one or both of the transmit and receive paths of the audio device 104.

The audio processing system 210 is configured to receive the acoustic signals from an acoustic source via the primary microphone 106 and secondary microphone 108 and process the acoustic signals. Processing may include performing noise reduction within an acoustic signal. The audio processing system 210 is discussed in more detail below. The primary and secondary microphones 106, 108 may be spaced a distance apart in order to allow for detecting an energy level difference, time difference or phase difference between them. The acoustic signals received by primary microphone 106 and secondary microphone 108 may be converted into electrical signals (i.e. a primary electrical signal and a secondary electrical signal). The electrical signals may themselves be converted by an analog-to-digital converter (not shown) into digital signals for processing in accordance with some embodiments. In order to differentiate the acoustic signals for clarity purposes, the acoustic signal received by the primary microphone 106 is herein referred to as the primary acoustic signal, while the acoustic signal received from by the secondary microphone 108 is herein referred to as the secondary acoustic signal. The primary acoustic signal and the secondary acoustic signal may be processed by the audio processing system 210 to produce a signal with an improved signal-to-noise ratio. It should be noted that embodiments of the technology described herein may be practiced utilizing only the primary microphone 106.

The output device 206 is any device which provides an audio output to the user. For example, the output device 206 may include a speaker, an earpiece of a headset or handset, or a speaker on a conference device.

In various embodiments, where the primary and secondary microphones are omni-directional microphones that are closely-spaced (e.g., 1-2 cm apart), a beamforming technique may be used to simulate forwards-facing and backwards-facing directional microphones. The level difference may be used to discriminate speech and noise in the time-frequency domain which can be used in noise reduction.

Figure 3:
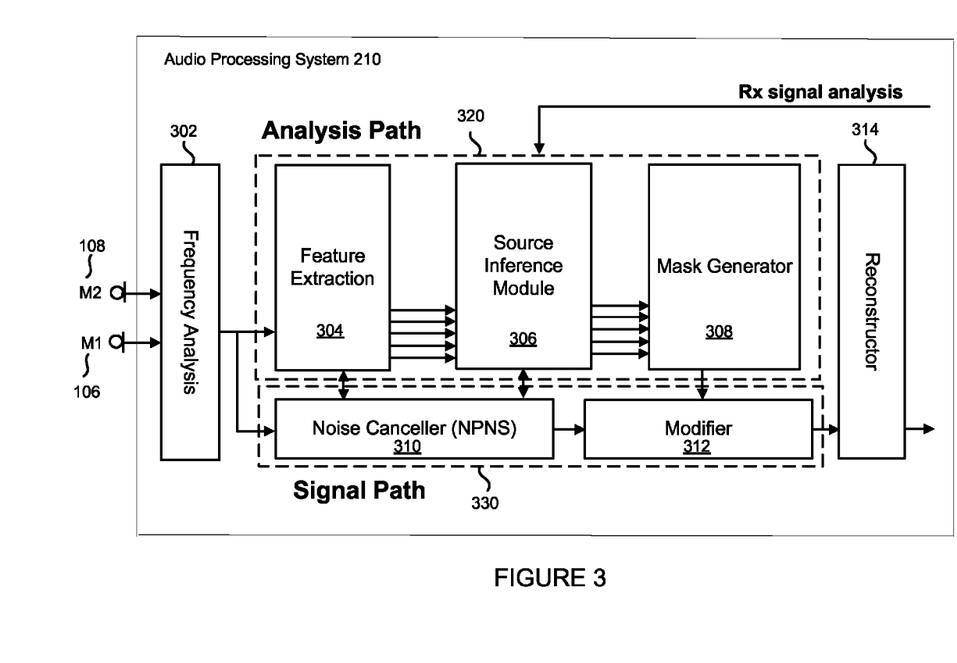
FIG. 3 is a block diagram of an exemplary audio processing system.

FIG. 3 is a block diagram of an exemplary audio processing system 210 for performing noise reduction. Audio processing system 210 may be embodied within a memory device within audio device 104. The audio processing system 210 may include a frequency analysis module 302, feature extraction module 304, source inference module 306, mask generator module 308, noise canceller module 310, modifier module 312, and reconstructor module 314. Audio processing system 210 may include more or fewer components than illustrated in FIG. 3, and the functionality of modules may be combined or expanded into fewer or additional modules. Exemplary lines of communication are illustrated between various modules of FIG. 3, and in other figures herein. The lines of communication are not intended to limit which modules are communicatively coupled with others, nor are they intended to limit the number of and type of signals communicated between modules.

In operation, acoustic signals received from the primary microphone 106 and second microphone 108 are converted to electrical signals which are processed through frequency analysis module 302. The acoustic signals may be pre-processed in the time domain before being processed by frequency analysis module 302. Time domain pre-processing may include applying input limiter gains, speech time stretching, and filtering using an FIR or IIR filter.

The frequency analysis module 302 receives the acoustic signals and mimics the frequency analysis of the cochlea (e.g., cochlear domain), simulated by a filter bank. The frequency analysis module 302 separates each of the primary acoustic signal and secondary acoustic signal into two or more frequency sub-band signals. The samples of the frequency sub-band signals may be grouped sequentially into time frames (e.g. over a predetermined period of time). For example, the length of a frame may be 4 ms, 8 ms, or some other length of time. In some embodiments there may be no frame at all. The results may include sub-band signals in a fast cochlea transform (FCT) domain.

The sub-band frame signals are provided by frequency analysis module 302 to an analysis path sub-system 320 and a signal path sub-system 330. The analysis path sub-system 320 may process the signal to identify signal features, classify sub-band signals as having speech components or noise components, and generate a signal modifier for noise reduction. The signal path sub-system 330 is responsible for modifying sub-band signals via noise reduction. Noise reduction may include performing subtractive noise cancellation of the primary acoustic signal and applying a modifier, such as a multiplicative gain mask generated in the analysis path sub-system 320, to the sub-band signals. The noise reduction may reduce noise and preserve the desired speech components in the sub-band signals.

Noise reduction may be performed to optimize performance of an automatic speech recognition system operating on the reconstructed signal. Hence, reconstructor 314 may output a reconstructed signal to an automated speech recognition system. Noise reduction may be performed in the form of subtractive noise reduction by noise canceller 310 or noise suppression utilizing a multiplicative mask by modifier 312 to prepare the signal for automatic speech recognition.

Signal path sub-system 330 includes noise canceller module 310 and modifier module 312. Noise canceller module 310 receives sub-band frame signals from frequency analysis module 302. Noise canceller module 310 may subtract (e.g., cancel) a noise component from one or more sub-band signals of the primary acoustic signal. As such, noise canceller module 310 may output sub-band estimates of noise components in the primary signal and sub-band estimates of speech components in the form of noise-subtracted sub-band signals. Noise canceller module 310 may be implemented as a single subtractive block or a cascade of subtractive blocks (i.e., a cascade of subtractive blocks used for an N microphone system). Noise canceller module 310 may provide a noise cancelled signal to feature extraction module 304. The noise cancelled signal provided to feature extraction module 304 may be the output of noise canceller module 310 or an output of a cascade block within module 310.

Noise canceller module 310 may provide noise cancellation, for example in systems with two-microphone configurations, based on source location by means of a subtractive algorithm. Noise canceller module 310 may also provide echo cancellation and is intrinsically robust to loudspeaker and Rx path non-linearity. By performing noise and echo cancellation (e.g., subtracting components from a primary signal sub-band) with little or no voice quality degradation, noise canceller module 310 may increase the speech-to-noise ratio (SNR) in sub-band signals received from frequency analysis module 302 and provided to modifier module 312 and post filtering modules. The amount of noise cancellation performed may depend on the diffuseness of the noise source and the distance between microphones, both of which contribute towards the coherence of the noise between the microphones, with greater coherence resulting in better cancellation.

An example of noise cancellation performed in some embodiments by the noise canceller module 310 is disclosed in U.S. patent application Ser. No. 12/215,980, entitled "System and Method for Providing Noise Suppression Utilizing Null Processing Noise Subtraction," filed Jun. 30, 2008, and U.S. application Ser. No. 12/422,917, entitled "Adaptive Noise Cancellation," filed Apr. 13, 2009, both of which are incorporated herein by reference.

The feature extraction module 304 of the analysis path sub-system 320 receives the sub-band frame signals provided by frequency analysis module 302 as well as an output of noise canceller 310 (e.g., the output of the entire module 310 or an output of a cascade block within module 310). Feature extraction module 304 computes frame energy estimations of the sub-band signals, spatial features such as NP-ILD, ILD, ITD, and IPD between the primary acoustic signal and the secondary acoustic signal or output of noise canceller 310, self-noise estimates for the primary and second microphones, as well as other monaural or binaural features which may be utilized by other modules, such as pitch estimates and cross-correlations between microphone signals.

A raw ILD between a primary and secondary microphone may be represented mathematically as $$ILD = \left[\left\lfloor c \cdot \log_2\left(\frac{E_1}{E_2}\right)\right\rfloor_{-1}\right]_{+1}$$

where E1 and E2 are the energy outputs of the primary and secondary microphones 106, 108, respectively, computed in each sub-band signal over non-overlapping time intervals ("frames"). This equation describes the dB ILD normalized by a factor of c and limited to the range [−1, +1]. Thus, when the audio source 102 is close to the primary microphone 106 for E1 and there is no noise, ILD=1, but as more noise is added, the ILD will be reduced.

In order to avoid limitations regarding raw ILD used to discriminate a source from a distracter, outputs of noise cancellation module 330 may be used to derive an NP-ILD having a positive value for the speech signal and small or negative value for the noise components since these will be significantly attenuated at the output of the noise cancellation module 310. The NP-ILD may be represented mathematically as:

$$NP - ILD = \left[\left\lfloor c \cdot \log_2\left(\frac{E_{NP}}{E_2}\right)\right\rfloor_{-1}\right]_{+1}$$

where $E_{NP}$ is the output energy of noise canceller 310.

IPD may be expressed as:

$$\Delta\phi(\omega, t) = \angle\left(\sum_{n=tT}^{(t+1)T-1} x_s(\omega, n) x_p^*(\omega, n)\right)$$

where $x_p^*(\omega,n)$ and $x_s(\omega,n)$ are the conjugate primary and secondary ACS signals at angular frequency $\omega=2\Pi f$, respectively, t is the time frame index, and T is the frame length in samples ITD may be represented as:

$$\Delta\phi(\omega,t)/\omega.$$

In a theoretical case of two microphones spaced d meters apart in free-space with a sound arriving along the axis between the two microphones (c is the speed of sound in m/s):

$$\Delta\phi = \omega\frac{d}{c}.$$

Determining energy level estimates and inter-microphone level differences is discussed in more detail in U.S. patent application Ser. No. 11/343,524, entitled "System and Method for Utilizing Inter-Microphone Level Differences for Speech Enhancement", which is incorporated by reference herein.

Source inference module 306 may process features provided by feature extraction module 304 to classify a signal as wanted (i.e., speech) or unwanted (noise or echo). The features include frame energy estimations used to compute noise estimates and derive models of the noise and speech in the sub-band signals. Source inference module 306 adaptively estimates attributes of the acoustic sources, such as their energy spectra of the output signal of the noise canceller 310. The energy spectra attribute may be utilized to generate a multiplicative mask in mask generator module 308.

The source inference module 306 may receive the NP-ILD from feature extraction module 304 and track the NP-ILD probability distributions or "clusters" of the target audio source 102, background noise and optionally echo.

This information is then used, along with other auditory cues, to define classification boundaries between source and noise classes. The NP-ILD distributions of speech, noise and echo may vary over time due to changing environmental conditions, movement of the audio device 104, position of the hand and/or face of the user, other objects relative to the audio device 104, and other factors. The cluster tracker adapts to the time-varying NP-ILD as well as other spatial features and monaural features derived from the speech and noise source(s) or input acoustic signals When ignoring echo, without any loss of generality, when the source and noise ILD distributions are non-overlapping, it is possible to specify a classification boundary or dominance threshold between the two distributions, such that the signal is classified as speech if the SNR is sufficiently positive or as noise if the SNR is sufficiently negative. This classification may be determined per sub-band and time-frame as a dominance mask, and output by a cluster tracker module to a noise estimator module (not illustrated) within source inference module 306.

The cluster tracker may determine a global summary of acoustic features based, at least in part, on acoustic features derived from an acoustic signal, as well as an instantaneous global classification based on a global running estimate and the global summary of acoustic features. The global running estimates may be updated and an instantaneous local classification is derived based on at least the one or more acoustic features. Spectral energy classifications may then be determined based, at least in part, on the instantaneous local classification and the one or more acoustic features.

The cluster tracker may generate a noise/speech classification signal per sub-band and provide the classification to noise canceller 310. In some embodiments, the classification is a control signal indicating the differentiation between noise and speech. Noise canceller module 310 may utilize the classification signals to estimate noise in received microphone signals.

An example of tracking clusters by a cluster tracker module is disclosed in U.S. patent application Ser. No. 12/004,897, entitled "System and method for Adaptive Classification of Audio Sources," filed on Dec. 21, 2007, the disclosure of which is incorporated herein by reference.

Source inference module 306 may include a noise estimate module (not illustrated) configured to receive a noise/speech classification control signal from the cluster tracker module and the output of noise canceller module 310 to estimate the noise $N(t,w)$, wherein t is a point in time and w represents a sub-band index. The noise estimate determined by noise estimate module is provided to mask generator module 308. In some embodiments, mask generator module 308 receives the noise estimate of output of noise canceller module 310 and an output of the cluster tracker module.

The noise estimate module in the source inference module 306 may include an NP-ILD noise estimator and a stationary noise estimator. The noise estimates can be combined, such as for example with a max( ) operation, so that the noise suppression performance resulting from the combined noise estimate is at least that of the individual noise estimates.

The NP-ILD noise estimate may be derived from the dominance mask and noise canceller module 310 output signal energy. When the dominance mask is 1 (indicating speech) in a particular sub-band, the noise estimate is frozen, and when the dominance mask is 0 (indicating noise) in a particular sub-band, the noise estimate is set equal to the NPNS output signal energy. The stationary noise estimate tracks components of the NPNS output signal that vary more slowly than speech typically does, and the main input to this module is the NPNS output energy.

Source inference module 306 may adaptively classify sub-band signals based on spatial features and monaural features, and is discussed in more detail below with respect to FIG. 4.

Mask generator module 308 receives models of the sub-band speech components and noise components as estimated by the source inference module 306 and generates a multiplicative mask. The multiplicative mask is applied to the estimated noise subtracted sub-band signals provided by noise canceller module 310. The modifier module 312 multiplies the gain masks to the noise-subtracted primary acoustic sub-band signals output by noise canceller 310. Applying the mask reduces energy levels of noise components in the sub-band signals of the primary acoustic signal and results in noise reduction.

The multiplicative mask may be defined by a Wiener filter and a voice quality optimized suppression system. The Wiener filter estimate may be based on the power spectral density of noise and a power spectral density of the primary acoustic signal. The Wiener filter derives a gain based on the noise estimate. The derived gain is used to generate an estimate of the theoretical MMSE of the clean speech signal given the noisy signal. The values of the gain mask output from mask generator module 308 optimize noise reduction on a per sub-band basis per frame. The noise reduction may be subject to the constraint that the speech loss distortion complies with a tolerable threshold limit.

Applying the multiplicative mask to sub-bands may reduce the energy level of the sub-band signal noise component to no less than a residual noise target level, which may be fixed or slowly time-varying. In some embodiments, the residual noise target level is the same for each sub-band signal, in other embodiments it may vary across sub-bands. Such a target level may be a level at which the noise component ceases to be audible or perceptible, below a self-noise level of a microphone used to capture the primary acoustic signal, or below a noise gate of a component on a baseband chip or of an internal noise gate within a system implementing the noise reduction techniques.

Modifier module 312 receives the signal path cochlear samples from noise canceller module 310 and applies a gain mask received from mask generator 308 to the received samples. The signal path cochlear samples may include the noise subtracted sub-band signals for the primary acoustic signal. The mask provided by the Wiener filter estimation may vary quickly, such as from frame to frame, and noise and speech estimates may vary between frames. To help address the variance, the upwards and downwards temporal slew rates of the mask may be constrained to within reasonable limits by modifier 312. The mask may be interpolated from the frame rate to the sample rate using simple linear interpolation, and applied to the sub-band signals by multiplicative noise suppression. Modifier module 312 may output masked frequency sub-band signals.

Reconstructor module 314 may convert the masked frequency sub-band signals from the cochlea domain back into the time domain. The conversion may include adding the masked and phase shifted frequency sub-band signals. Alternatively, the conversion may include multiplying the masked frequency sub-band signals with an inverse frequency of the cochlea channels. Once conversion to the time domain is completed, the synthesized acoustic signal may be output to the user via output device 206 and/or provided to a codec for encoding.

In some embodiments, additional post-processing of the synthesized time domain acoustic signal may be performed. For example, comfort noise generated by a comfort noise generator may be added to the synthesized acoustic signal prior to providing the signal to the user. Comfort noise may be a uniform constant noise that is not usually discernable to a listener (e.g., pink noise). This comfort noise may be added to the synthesized acoustic signal to enforce a threshold of audibility and to mask low-level non-stationary output noise components. In some embodiments, the comfort noise level may be chosen to be just above a threshold of audibility and may be settable by a user. In some embodiments, the mask generator module 308 may have access to the level of comfort noise in order to generate gain masks that will suppress the noise to a level at or below the comfort noise.

The system of FIG. 3 may process several types of signals received by an audio device. The system may be applied to acoustic signals received via one or more microphones. The system may also process signals, such as a digital Rx signal, received through an antenna or other connection.

Figure 4:
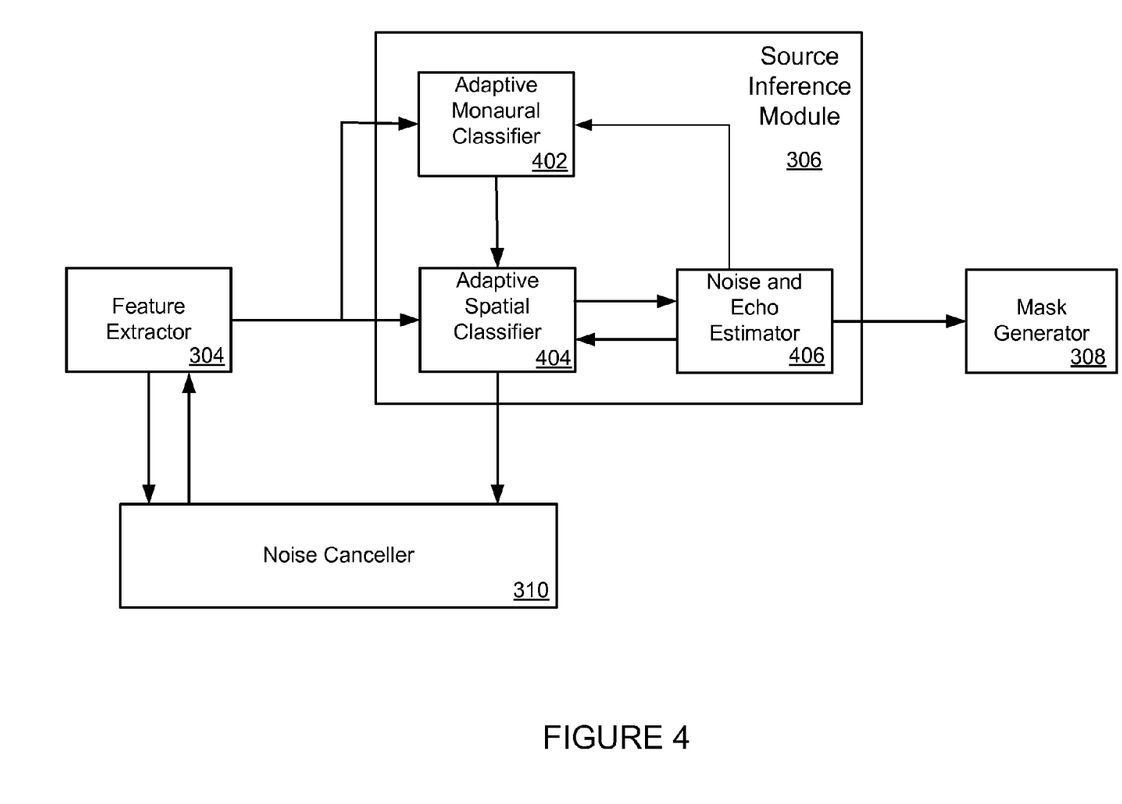
FIG. 4 is a block diagram of an exemplary source inference module.

FIG. 4 is a block diagram of an exemplary source inference module 306. Source inference module 306 includes adaptive monaural classifier 402, adaptive spatial classifier 404 and noise and echo estimator 406. Other modules may be implemented in source inference module 306 as well, or within the modules of source inference module 306, such as a cluster tracker module and a dominance mask generator module. Source inference module 306 may communicate with feature extractor 304, noise canceller 310, and mask generator 308.

Adaptive monaural classifier 402 receives monaural features extracted from the primary acoustic signal, secondary acoustic signal or noise canceller output signal from feature extractor 304. The monaural features may include pitch, pitch salience, signal level, a mask indicating echo activity The adaptive monaural classifier 402 may also receive features such as stationary noise and echo estimates from noise and echo estimator 406. Adaptive monaural classifier 402 classifies a sub-band time frame cell as speech, noise or echo based on the received features, generates a monaural dominance mask from the classification and provides the mask to adaptive spatial classifier 404.

Adaptive spatial classifier 404 receives features from feature extractor 304, a monaural dominance mask from adaptive monaural classifier 402, and a stationary noise and echo estimate from noise and echo estimator 406. Classifier 404 may also receive a noise subtracted sub-band signal from noise canceller 310. The features received from feature extractor 304 may include ILD, NP-ILD, IPD, a global NP-ILD (average NP-ILD across all sub-bands for the current frame), and ITD, and optionally other multi-microphone features or binaural features. For example, the adaptive spatial classifier may generate a first classification based on a raw ILD, wherein the first classification is provided to noise canceller 310 to control adaptation, and a second classification may track NP-ILD and be used to generate a dominance mask.

Adaptive spatial classifier 404 classifies speech versus noise or echo based on the received monaural dominance mask, binaural features, and stationary noise and echo estimates, and generates a binaural dominance mask based on the classification by classifier 404. The classification by the adaptive spatial classifier 404 may be made based on one feature or several binaural features, and may track the features of speech, noise and echo separately. Adaptive spatial classifier 404 provides the binaural dominance mask to noise and echo estimator along with one or more binaural features. The binaural dominance mask may identify each sub-band time frame cell as speech, noise or echo.

Adaptive spatial classifier 404 may also track spatial features such as $\sigma$ and $\alpha$. The $\sigma$ parameter may encode a phase difference and ILD difference between microphones and is used for subtractive cancellation of a speech component correlated between two microphones via a complex multiply. The $\alpha$ parameter may encode a time difference and inter-aural level difference between a noise reference and primary acoustic sub-band signals. The tracked spatial features $\sigma$ and $\alpha$ are provided to noise canceller 310 by adaptive spatial classifier 404.

Adaptive spatial classifier may 404 may compute a dominance mask and track spatial features such as ILD (raw ILD or NP-ILD). With respect to computing a dominance mask, the ability to suppress non-stationary noise at low SNR with two microphones results primarily from the discriminability in ILD space between target source and noise sources. When these ILD distributions are non-overlapping, it is possible to specify a classification boundary or dominance threshold between the two distributions, such that the current frame of the signal sub-band is classified as speech if the SNR is sufficiently positive or as noise if the SNR is sufficiently negative. This classification per sub-band and time-frame is the dominance mask.

The dominance mask may be computed based on two factors: (i) the ILD distributions of target source and noise sources are in general overlapping, and (ii) when the SNR is close to 0 dB, the measured ILD will be between the target source and noise ILDs. The dominance threshold may be set at a value that achieves a desired perceptual tradeoff between speech distortion resulting from speech mis-classified as noise ("false rejects"), and noise leakage resulting from noise mis-classified as speech ("false alarms"). In some embodiments, the dominance threshold may be placed at an intermediate point between the source cluster mean ILD and either of the noise cluster and ECHO mean ILDs. The relative distance between the dominance threshold and the two neighboring clusters determines the particular tradeoff of speech distortion vs. noise leakage.

With respect to tracking spatial features, an ILD spatial feature may be tracked by a cluster module by estimating the means of the source cluster, noise cluster, and echo cluster probability distributions as a function of ILD. A cluster tracker module within the adaptive spatial classifier 404 may ensure that the target source and noise clusters are true representations of the actual ILD distributions. As such, the dominance threshold may be set at a value that achieves the desired tradeoff between false rejects and false alarms. To simplify matters, the cluster tracker may be responsible for tracking the mean of the target source and noise distributions. The cluster tracker may also track the mean ILD of the echo distribution.

The cluster tracker may track the means of the source ILD distribution, noise ILD distribution, and when activated, the echo ILD distribution. Each distribution is implemented, for example, with a Robbins-Monro percentile tracker plus an activity detector (AD) per sub-band/time frame. The corresponding three activity detectors may include a target source activity detector, a noise activity detector, and a echo activity detector.

Each percentile tracker is implemented as follows:
if AD(k, n)
  if inILD(k, n)>sD.ILD
    sD.ILD=sD.ILD+upBump
  else
    sD.ILD=sD.ILD+downBump
  end
  sD.ILD=min(maxIld, max(minIld, sD.ILD))
end where inILD is the ILD passed to the percentile tracker, sD.ILD is the cluster mean carried over from the previous frame, minILD and maxILD define the allowed ILD limits for each cluster, and upBump and downBump are constants that can be derived from the percentile value and time constant of the percentile tracker.

The target source activity detector, noise activity detector and echo activity detector use features from feature extractor 304, a monaural dominance mask from adaptive monaural classifier 402, and a stationary noise and echo estimate from noise and echo estimator 406.

The target source activity detector may be configured such that the source cluster is updated during non-stationary pitched activity on the near-end primary microphone in the absence of echo, and when the global ILD is sufficiently large, which is typically the case during voiced activity of the near-end user.

The noise activity detector may be configured such that the noise cluster is updated when there is no echo and the measured ILD is within the expected range for noise. The noise cluster may also be updated based on when the measured ILD is lower than the speech ILD by a configurable amount as a precaution to protect against voice quality degradation, thereby causing the noise cluster to remain at least a configurable distance from the source ILD.

An echo activity detector may be configured such that an echo cluster is updated when there is simultaneously far-end and near-end (echo) non-stationary activity, and the global and per sub-band measured ILDs are lower than the source ILD by a configurable value.

Noise and echo estimator 406 receives the dominance mask from adaptive spatial classifier 404 and generates a noise and echo estimate. The noise and echo estimate is provided by estimator 406 to mask generator 308. Noise and echo estimator 406 also provide a stationary noise level to adaptive spatial classifier 404 and adaptive monaural classifier 402.

Figure 5:
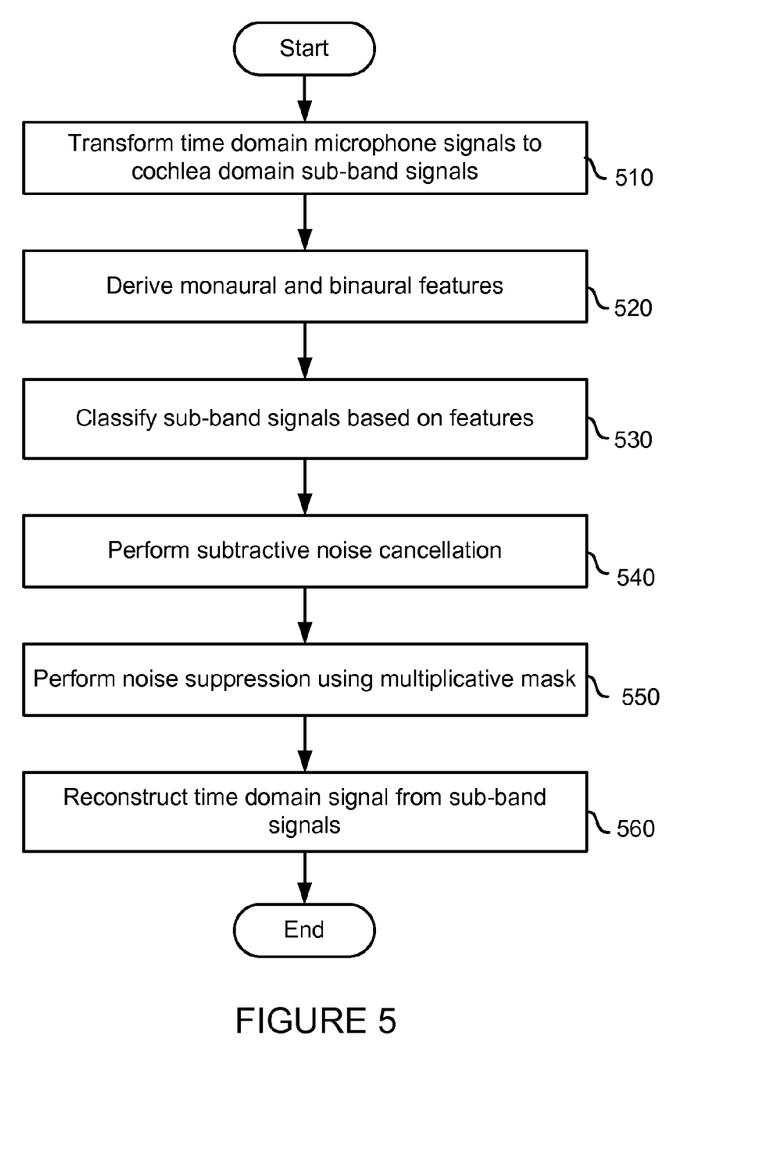
FIG. 5 is a flowchart of an exemplary method for performing noise reduction for an acoustic signal.

FIG. 5 is a flowchart of an exemplary method for performing noise reduction for an acoustic signal. Time domain microphone signals are transformed into cochlea domain sub-band signals at step 510. The transformation may be performed for signals received from primary microphone 106 and secondary microphone 108 by frequency analysis module 302.

Monaural and binaural features may be derived at step 520. The features may be derived by feature extraction module 304. Deriving monaural and binaural features is described in more detail below with respect to the method of FIG. 6. Sub-band signals may be classified based on the derived features at step 530. Each sub-band may be classified as either speech, noise or echo for each time frame. The classification may be based upon the derived monaural and binaural features, a noise cancelled signal, and stationary noise and echo estimates.

Subtractive noise cancellation is performed at step 540. The noise cancellation may be performed by noise canceller 310 to sub-band signals received by frequency analysis module 302. The noise cancellation may be performed using tracked spatial parameters σ and α, provided to noise canceller 310 by source inference engine 306.

A multiplicative mask is applied to the noise subtracted signals output by noise canceller 310 at step 550. The multiplicative mask is generated as a result of the adaptive spatial classifier classification of each sub-band time frame cell as speech, noise or echo. The multiplicative mask may be generated by mask generator 308 and applied to the noise subtracted sub-band signals per frame by modifier 312.

A time domain signal is reconstructed from noise reduced sub-band signals at step 560. The reconstruction is performed by reconstructor 314 and performed using complex multiplies and delays.

Figure 6:
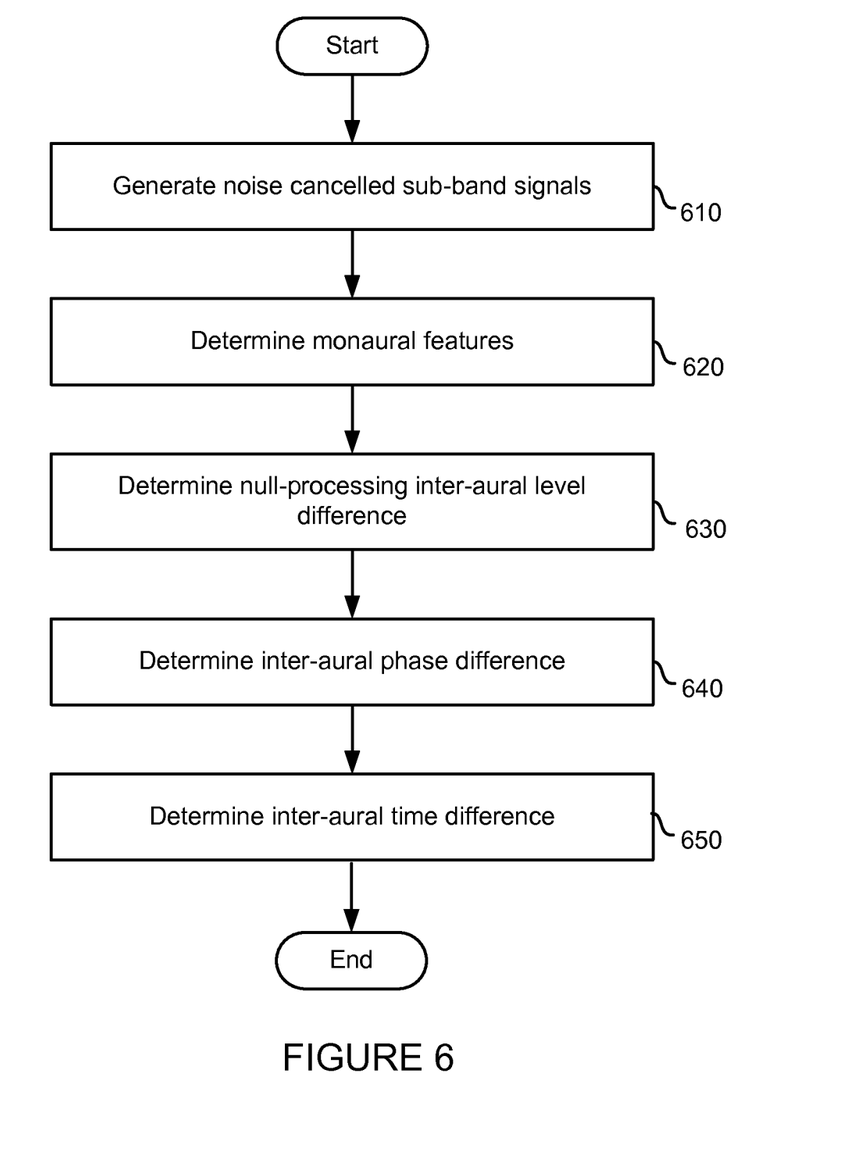
FIG. 6 is a flowchart of an exemplary method for generating spatial features.

FIG. 6 is a flowchart of an exemplary method for generating spatial features. Noise cancelled sub-band signals may be generated at step 610. The noise cancelled sub-band signals may be provided by noise canceller 310 to feature extraction module 304.

Monaural features may be determined at step 620. The monaural features may be determined from a noise cancelled sub-band signal, or directly from a single microphone signal by adaptive monaural classifier 402, and may include pitch, pitch salience, signal level, and so forth.

A null-processing inter-aural level difference (NP-ILD) may be determined at step 630. The NP-ILD may be generated for each sub-band and time frame cell and averaged over each sub-band for a time frame (global NP-ILD) by source inference module 306. The NP-ILD may be generated as a ratio of the energy level of a noise cancelled sub-band signal and an energy level of a microphone other than a primary microphone.

An inter-aural phase difference may be determined at step 640. The inter-aural phase difference (IPD) may be determined at step 640. The IPD may be determined as the phase difference between two microphone signal waveforms. An inter-aural time difference may be determined at step 650. The inter-aural time difference (ITD) may be determined by dividing the IPD by the frequency of the sub-band.

The above described modules, including those discussed with respect to FIGS. 3 and 4, may include instructions stored in a storage media such as a machine readable medium (e.g., computer readable medium). These instructions may be retrieved and executed by the processor 202 to perform the functionality discussed herein. Some examples of instructions include software, program code, and firmware. Some examples of storage media include memory devices and integrated circuits.

While the present invention is disclosed by reference to the preferred embodiments and examples detailed above, it is to be understood that these examples are intended in an illustrative rather than a limiting sense. It is contemplated that modifications and combinations will readily occur to those skilled in the art, which modifications and combinations will be within the spirit of the invention and the scope of the following claims.

What is claimed is:

1. A method for performing noise reduction in an audio signal, the method comprising:

executing a frequency analysis module by a processor to transform a primary acoustic signal and one or more secondary acoustic signals to frequency domain sub-band signals, each of the primary acoustic signal and the one or more secondary acoustic signals representing at least one captured sound from a primary microphone and at least one secondary microphone, respectively;

forming a noise cancelled sub-band signal from at least one of the frequency domain sub-band signals by performing at least one of subtractive noise cancellation and echo cancellation;

deriving a null-processing inter-aural level difference (NP-ILD) feature from the noise cancelled sub-band signal and a raw microphone signal obtained from the at least one secondary microphone;

deriving an inter-aural level difference (ILD) feature based on energy outputs of the primary microphone and the at least one secondary microphone;

classifying each of a plurality of the frequency domain sub-band signals as speech or noise, based on a set of derived features including the NP-ILD feature and the ILD feature; and performing noise reduction on the plurality of the frequency domain sub-band signals based on the classification.

2. The method of claim 1, wherein performing noise reduction includes performing the subtractive noise cancellation on the frequency domain sub-band signals associated with the primary acoustic signal.

3. The method of claim 1, wherein performing noise reduction includes applying a multiplicative mask to the frequency domain sub-band signals associated with the primary acoustic signal.

4. The method of claim 1, wherein the set of derived features includes a further spatial feature computed based on a difference between two of the frequency domain sub-band signals.

5. The method of claim 4, wherein the further spatial feature includes an inter-aural time difference derived from the primary acoustic signal and one of the one or more secondary acoustic signals.

6. The method of claim 4, wherein the further spatial feature includes a phase difference derived from the primary acoustic signal and one of the one or more secondary acoustic signals.

7. The method of claim 1, wherein at least one of the set of derived features is based on a ratio of a first energy of the noise cancelled sub-band signal and a second energy of one of the frequency domain sub-band signals associated with the one or more secondary acoustic signals.

8. The method of claim 1, wherein noise includes echo.

9. The method of claim 1, wherein the classifying is performed for each time frame and sub-band.

10. The method of claim 1, wherein the noise reduction is performed to optimize performance of an automatic speech recognition system.

11. A system for performing noise reduction in an audio signal, the system comprising:

a memory;

a frequency analysis module stored in the memory and executed by a processor to transform a primary acoustic signal and one or more secondary acoustic signals to frequency domain sub-band signals, each of the primary acoustic signal and the one or more secondary acoustic signals representing at least one captured sound from a primary microphone and at least one secondary microphone, respectively;

a noise canceller to form a noise cancelled sub-band signal from at least one of the frequency domain sub-band signals by performing at least one of subtractive noise cancellation and echo cancellation;

a feature extractor module executable to derive:

a null-processing inter-aural level difference (NP-ILD) feature from the noise cancelled sub-band signal and a raw microphone signal obtained from the at least one secondary microphone; and an inter-aural level difference (ILD) feature based on energy outputs of the primary microphone and the at least one secondary microphone;

a source inference module executable to classify each frequency domain sub-band signal as speech or noise based on a set of derived features including the NP-ILD feature and the ILD feature; and a noise reduction module executable to perform noise reduction on the frequency domain sub-band signals based on the classification.

12. The system of claim 11, the noise reduction module including the noise canceller configured to perform talk subtractive noise cancellation on the frequency domain sub-band signals associated with the primary acoustic signal.

13. The system of claim 11, the noise reduction module including a modifier configured to apply a multiplicative mask to the frequency domain sub-band signals associated with the primary acoustic signal.

14. The system of claim 11, wherein the feature extractor module is further executable to derive a further spatial feature, the set of derived features including the further spatial feature and the further spatial feature being computed based on a difference between two of the frequency domain sub-band signals.

15. The system of claim 14, wherein the further spatial feature includes one or more of an, inter-aural phase difference and an inter-aural time difference derived from the primary acoustic signal and one of the one or more secondary acoustic signals.

16. The system of claim 11, wherein at least one of the set of derived features is based on a ratio of a first energy of the noise cancelled sub-band signal and a second energy of one of the frequency domain sub-band signals associated with the one or more secondary acoustic signals.

17. The system of claim 11, the source inference module being executable to perform the classification for each time frame and sub-band.

18. A non-transitory computer readable storage medium having embodied thereon a program, the program being executable by a processor to perform a method for reducing noise in an audio signal, the method comprising:

transforming a primary acoustic signal and one or more secondary acoustic signals to frequency domain sub-band signals, each of the primary acoustic signal and the one or more secondary acoustic signals representing at least one captured sound from a primary microphone and at least one secondary microphone, respectively;

forming a noise cancelled sub-band signal from at least one of the frequency domain sub-band signals by performing at least one of subtractive noise cancellation and echo cancellation;

deriving a null-processing inter-aural level difference (NP-ILD) feature from the noise cancelled sub-band signal and a raw microphone signal obtained from the at least one secondary microphone;

deriving an inter-aural level difference (ILD) feature based on energy outputs of the primary microphone and the at least one secondary microphone;

classifying each of a plurality of the frequency domain sub-band signals as speech or noise, based on a set of derived features including the NP-ILD feature and the ILD feature; and performing noise reduction on the plurality of the frequency domain sub-band signals based on the classification.

* * * * *